Patented Apr. 1, 1941

2,236,574

UNITED STATES PATENT OFFICE 2,236,574

BIOCHEMICAL MANUFACTURE OF KETOSTEROIDS

Heinrich Koester, Berlin-Charlottenburg, and Luigi Mamoli, Berlin-Steglitz, Germany, and Alberto Vercellone, Milan, Italy, assignors to Schering Corporation, Bloomfield, N. J., a corporation of New Jersey No Drawing. Application May 28, 1938, Serial No. 210,778. In Germany June 3, 1937

22 Claims. (Cl. 195—12)

This invention relates to ketosteroids and compounds derivable therefrom as well as to a process of producing the same. The process of the invention consists in that steroids containing hydroxyl groups capable of dehydrogenation are subjected to the action of biochemical dehydrogenating agents and, if desired, also of biochemical hydrogenating agents.

For carrying out the biochemical dehydrogenation certain micro-organisms can be employed, for example bacteria or mold fungi or the enzymes obtainable therefrom. Among the bacteria may be mentioned for example the bacteria of the Acetobacter genus, in particular the *Acetobacter pasteurianum* and also Sorbose bacteria (*Acetobacter xylinum*; see Zentralblatt—(1896), vol. 1, pp. 1201–1202; see also Lafar "Handbuch der techn. Mykologie," vol. 5, page 565, published by Fischer, Jena, 1905–1914); among the mold fungi certain Aspergillacae can be employed with advantage.

As particularly advantageous has proved the application of the so-called "impoverished" yeast as is obtainable for example according to Wieland, "Annalen der Chemie," vol. 492, page 183 et seq. by shaking yeast suspensions in toluene-water with oxygen.

The biochemical dehydrogenation is suitably carried out under aerobic conditions or in the presence of hydrogen acceptors such as methylene blue, quinone or the like.

To the steroid compounds coming into consideration as starting materials for the biochemical dehydrogenation belong for example the sterols and bile acids containing hydroxyl groups capable of dehydrogenation and also degradation products thereof, compounds of the type of cortin and of the animal and vegetable heart poisons containing hydroxyl groups capable of dehydrogenation. Furthermore compounds of the pregnane series containing hydroxyl groups capable of dehydrogenation can be employed as starting materials and also compounds of the oestrane and androstane series containing hydroxyl groups capable of dehydrogenation. Of the last named, compounds free from side chains may be particularly mentioned, for example, compounds such as oestratriol, octahydrooestrons and also the unsaturated compounds of the androstane series, the androstene compounds dehydroandrosterone and androstendiol.

Should other hydroxyl groups capable of dehydrogenation be contained in the starting material in addition to the hydroxyl group or groups to be dehydrogenated, the former can if necessary be protected from attack by the biochemical dehydrogenating agent by converting them intermediately, for example by esterification, etherification, halogenation or the like, into groups which can be reconverted into hydroxyl groups.

The process according to the invention for biochemical dehydrogenation is particularly advantageous in the androstene series when it is combined with the biochemical process of hydrogenation, as described for example in Berichte, vol. 70, page 470 et seq. Thus for example in this manner in one operation it is possible to proceed from dehydroandrosterone by way of androstendione to testosterone.

For this purpose the dehydroandrosterone is first subjected by means of the impoverished yeast to biochemical oxidation to androstendione and there is then added to the biochemical oxidation mixture containing androstendione a substratum which now causes the biochemical reaction to proceed in the direction of reduction. Suitable for this purpose are for example additions of carbohydrates, of degradation products of carbohydrates, such as glycerol phosphoric acid and others.

The following examples may serve to illustrate the invention without, however, limiting the same to them.

*Example 1*

As nutrient solution for the bacteria is employed unhopped beer wort for lager beer. The maltose content of the wort is determined and brought by dilution with water to a content of about 4%. The nutrient solution is then after the addition of calcium carbonate heated for 20 minutes at 115° C. in an autoclave and after cooling filtered clear. The nutrient solution again heated under pressure is thereupon filled into sterile large Petri dishes and inoculated with the *Acetobacter pasteurianum*. After 3 days standing at room temperature there are carefully introduced into each Petri dish which contains 300 cc. of nutrient solution, a solution of 300 mg. of androstendiol in 15 cc. of ethyl alcohol. After further standing for 2 days at room temperature again the same quantity of androstendiol is introduced and again the whole allowed to stand for 2 days at the same temperature. Thereupon the contents of the Petri dishes are combined and exhaustively treated with ether.

The ethereal solution is freed by washing from the acetic acid which has likewise been produced in the fermentation, and evaporated to dryness. The residue is precipitated with digitonin, the filtrate freed from digitonin and treated in methanol with semicarbazide acetate. The semicarbazone is isolated and split in known manner. After treatment with methanol containing acid the whole is recrystallized from ethyl acetate. The product exhibits in ethanol a rotation of $$(\alpha)_D^{20} = +108°$$

M. P. 152° C. and is shown to be testosterone.

*Example 2*

With the application of the same substratum for the bacteria as described in the previous example, the alcoholic solution of the substance to be oxidized is added to the bacteria culture. 200 mg. of dehydroandrosterone are employed in the case of a quantity of substratum of 300 cc. After 3 days standing the whole is extracted with ether, the ethereal solution washed, dried and evaporated. The residue is then for removal of the unchanged dehydroandrosterone treated for 4 hours in absolute pyridine with phthalic anhydride, the reaction mixture poured into water, extracted with ether and the pyridine removed by washing with water containing acid. The acid phthalic acid ester of the dehydroandrosterone is then separated with alkali and an evaporation of the ethereal solution a crystallizate is obtained which is treated with methanol containing acid and after recrystallisation from hexane gives androstendione of rotation value $$(\alpha)_D^{20} = +198° (CHCl_3)$$

and M. P. 173° C.

*Example 3*

As described in Examples 1 and 2 in a further process androstendiol monopropionate-17 is subjected to oxidation, 300 mg. of this product (M. P. 146 C.;

$$(\alpha)_D^{20} = -62° (C_2H_5OH) )$$

being used for a bacteria culture with 300 cc. of substratum. After 4 days' standing at room temperature working up is carried out as described in Example 2, and also the unchanged monopropionate is removed as acid phthalic acid ester. The testosterone propionate remaining after the isoerization is then recrystallised from hexane and gives the following values: M. P. 121° C.;

$$(\alpha)_D^{20} = +87° (C_2H_5OH)$$

*Example 4*

In 1 liter of a nutrient solution containing 1% peptone, 0.2% ammonium biphosphate, 0.1% potassium biphosphate and 0.025% magnesium phosphate Sorbose bacteria (*Acetobacter xylinum*) are caused to develop. To the culture solution 10 cc. of a 2% solution of cholesterol in alcohol are added portionally. After standing for some time the reaction mixture is extracted with ether. The ethereal solution is washed with water, freed from water and evaporated to dryness. The residue is taken up with methanol and treated with semicarbazide acetate. The cholestenone semicarbazone is precipitated and filtered off. It yields after splitting in known manner the cholestenone of M. P. 80–81°;

$$(\alpha)_D^{20} = +87°$$

*Example 5*

8 grams of yeast (Milan flocculent ferment) are suspended in 30 cc. of water and treated with 10 cc. of N/5 Na₂HPO₄ solution and 10 cc. of N/5 KH₂PO₄ solution. The suspension is shaken for 20 hours in an oxygen atmosphere at 32° C., then 190 mg. of androstendiol, suspended in 30 cc. of water, are added and finally the mixture is shaken for a further 47 hours in an oxygen atmosphere. Thereupon the reaction mixture is extracted with ether; the ethereal solution is washed with water, caustic soda lye, N/1 hydrochloric acid and again with water. After drying over sodium sulphate the ethereal solution is evaporated to dryness.

The residue is dissolved in 30 cc. of alcohol, heated with 3 grams of glacial acetic acid and 1.5 grams of P. reagent (Girard, Helv. Chim. Acta 19, 1095 (1935)) and heated to boiling for 1 hour under reflux. After cooling, the whole is poured into 140 cc. of water, 60 grams of ice and the quantity of sodium hydroxide necessary for neutralization of 2.7 grams of glacial acetic acid. The whole is then extracted 3 times with ether in order to remove the portion free from keto groups.

To the aqueous solution are added 20 grams of 50% sulphuric acid whereby a turbidity is produced. The solution is allowed to stand for one hour and it is then extracted 3 times with ether, the ethereal solution washed with water, dried over sodium sulphate and the ether evaporated. If the residue is again treated with some ether it can be produced in crystalline form.

After recrystallization of the residue from dilute acetone a substance is obtained of M. P. 168–169° C. which is shown to be identical with androstendione.

*Example 6*

8 grams of yeast (Milan flocculent ferment) are suspended in 30 cc. of water, treated with 10 cc. of N/5 Na₂HPO₄ solution and 10 cc. of N/5 KH₂PO₄ solution and shaken for 20 hours in an oxygen atmosphere at 32° C. Then 200 mg. of dehydroandrosterone, suspended in 30 cc. of water are introduced and the mixture subsequently shaken for a further 48 hours in an oxygen atmosphere.

Thereupon a solution of 25 grams of invert sugar in 150 cc. of water is introduced and the reaction mixture allowed to stand in a fermentation vessel for 3 days at room temperature.

The reaction mixture is then extracted with ether and the ethereal solution washed with water, caustic soda lye, N/1 hydrochloric acid and again with water. After drying over sodium sulphate the ethereal solution is evaporated. The remaining residue is recrystallized from acetone and petrol ether. There are obtained 120 mg. of a substance of M. P. 151° C. which is shown to be identical with testosterone.

On the basis of the process according to the invention for dehydrogenation or dehydrogenation and hydrogenation it is possible in a relatively simple manner and with the production of relatively high yields to produce valuable ketosteroids which were hitherto only obtainable by relatively cumbersome methods or only in relatively small yields.

Of course, various modifications and changes in the reaction condition etc. may be made by those skilled in the art in accordance with the principles set forth herein and in the claims annexed hereto.

What we claim is:

1. Process for the manufacture of ketosteroids comprising subjecting steroids containing hydroxyl groups capable of dehydrogenation to the action of biochemical dehydrogenating agents, and isolating from the dehydrogenation mixture the keto steroids formed.

2. Process as claimed in claim 1 in which steroid compounds free from side chains at the 17-carbon atom are employed as starting materials.

3. Process as claimed in claim 1 in which unsaturated compounds of the androstane series are employed as starting materials.

4. Process as claimed in claim 1 in which androstendiol is employed as starting material.

5. Process as claimed in claim 1 in which dehydroandrosterone is employed as starting material.

6. Process as claimed in claim 1 in which the biochemical dehydrogenation is carried out under aerobic conditions.

7. Process as claimed in claim 1 in which the biochemical dehydrogenation is carried out by means of bacteria of the genus Acetobacter.

8. Process as claimed in claim 1 in which the biochemical dehydrogenation is carried out by means of *Acetobacter pasteurianum*.

9. Process as claimed in claim 1 in which for carrying out the biochemical dehydrogenation "impoverished" yeast is employed.

10. Process for the manufacture of ketosteroids, which comprises converting at least one but less than all of the hydroxyl groups of a steroid having a plurality of hydroxyl groups capable of dehydrogenation, into a group or groups which are not attacked during the dehydrogenation defined hereinbelow, subjecting the hydroxy derivative to the action of a biochemical dehydrogenating agent, and recovering the ketonic reaction product from the reaction mixture.

11. Process for the manufacture of keto hydroxy steroids comprising subjecting steroids containing more than one hydroxyl group capable of dehydrogenation, to the action of a biochemical dehydrogenating agent, then causing a biochemical hydrogenating agent to act upon the so obtained polyketo compounds, and recovering the formed keto hydroxy compounds from the reaction mixture.

12. Process for the manufacture of keto hydroxy steroids comprising subjecting steroids containing more than one hydroxyl group capable of dehydrogenation, to the action of oxidizing bacteria of the genus Acetobacter, causing a biochemical hydrogenating agent to act upon the so obtained polyketo compounds, and isolating the formed keto hydroxy compounds from the reaction mixture.

13. Process as set forth in claim 10, in which the hydroxyl group or groups which are not to be dehydrogenated are esterified prior to the dehydrogenation.

14. Process as set forth in claim 10, in which the hydroxyl group or groups which are not to be dehydrogenated are etherified prior to the dehydrogenation.

15. Process as set forth in claim 10, in which the hydroxyl group or groups which are not to be dehydrogenated are replaced by halogen prior to the dehydrogenation.

16. Process according to claim 10, wherein the substituted hydroxyl group or groups are reconverted to the free hydroxyl group or groups after the dehydrogenation.

17. Process as set forth in claim 10, in which the hydroxyl group or groups which are not to be dehydrogenated are esterified prior to the dehydrogenation, and reconverting the substituted hydroxyl group or groups into the free hydroxyl group or groups after the hydrogenation.

18. Process as set forth in claim 10, in which the hydroxyl group or groups which are not to be dehydrogenated are etherified prior to the dehydrogenation, and reconverting the substituted hydroxyl group or groups into the free hydroxyl group or groups after the hydrogenation.

19. Process as set forth in claim 10, in which the hydroxyl group or groups which are not to be dehydrogenated are replaced by halogen prior to the dehydrogenation, and reconverting the substituted hydroxyl group or groups into the free hydroxyl group or groups after the dehydrogenation.

20. Process for the manufacture of keto hydroxy steriods which comprises subjecting steroids having more than one hydroxyl group capable of dehydrogenation, to the action of oxidizing bacteria of the genus Acetobacter, and then subjecting the obtained polyketo compounds to the action of a reducing yeast in a fermenting substratum to cause partial hydrogenation.

21. Process for the manufacture of keto hydroxy steroids which comprises subjecting steroids containing more than one hydroxyl group capable of dehydrogenation, to a biochemical dehydrogenation with the aid of an "impoverished" yeast, and thereafter adding a substratum which is capable of being fermented by the yeast to cause partial biochemical hydrogenation of the polyketone.

22. Process for the manufacture of keto hydroxy steroids which comprises subjecting steroids containing more than one hydroxyl group capable of dehydrogenation to a biochemical dehydrogenation with the aid of an "impoverished" yeast, thereafter adding a carbohydrate substratum which is capable of being fermented by the yeast to cause partial biochemical hydrogenation of the polyketone.

HEINRICH KOESTER.
LUIGI MAMOLI.
ALBERTO VERCELLONE.